(12) United States Patent
McCutcheon

(10) Patent No.: US 11,804,792 B2
(45) Date of Patent: *Oct. 31, 2023

(54) MULTI-POLAR DC MACHINE

(71) Applicant: COALMONT ELECTRICAL DEVELOPMENT CORPORATION, McCalla, AL (US)

(72) Inventor: Shaun McCutcheon, Birmingham, AL (US)

(73) Assignee: COALMONT ELECTRICAL DEVELOPMENT CORPORATION, McCalla, AL (US)

(*) Notice: Subject to any disclaimer, the term of this patent is extended or adjusted under 35 U.S.C. 154(b) by 406 days.

This patent is subject to a terminal disclaimer.

(21) Appl. No.: 17/110,899

(22) Filed: Dec. 3, 2020

(65) Prior Publication Data

US 2021/0091689 A1 Mar. 25, 2021

Related U.S. Application Data

(63) Continuation of application No. 14/572,412, filed on Dec. 16, 2014, now Pat. No. 10,903,766.

(51) Int. Cl.
  *H02K 11/20* (2016.01)
  *H02P 6/16* (2016.01)
  *H02K 53/00* (2006.01)

(52) U.S. Cl.
  CPC ............... *H02P 6/16* (2013.01); *H02K 53/00* (2013.01)

(58) Field of Classification Search
  CPC .......... H02K 11/20; H02K 11/21; H02K 11/22
  See application file for complete search history.

(56) References Cited

U.S. PATENT DOCUMENTS

| | | | | |
|---|---|---|---|---|
| 4,663,536 A | * | 5/1987 | Roesel, Jr. | H02P 9/10 318/705 |
| 5,254,894 A | * | 10/1993 | Satake | H02P 1/50 310/113 |
| 6,198,196 B1 | * | 3/2001 | De Simon | H02K 11/33 310/68 B |
| 2002/0047413 A1 | * | 4/2002 | Leijon | H01F 27/288 310/112 |
| 2014/0225554 A1 | * | 8/2014 | Penkov | H02P 1/028 318/805 |

* cited by examiner

*Primary Examiner* — Dang D Le
(74) *Attorney, Agent, or Firm* — XSENSUS LLP

(57) ABSTRACT

Systems and methods for generating mechanical and/or electrical energy are presented. A system generates mechanical energy by using direct current to cause a plurality of rotors to rotate within and/or around a plurality of stators and generate electrical energy by using the rotation of the rotors within and/or around the stators to generate an electromagnetic field. Sensors provide information about the rotors and the stators to a control system which sends commands to alter various properties and conditions for the rotors and stators.

16 Claims, 17 Drawing Sheets

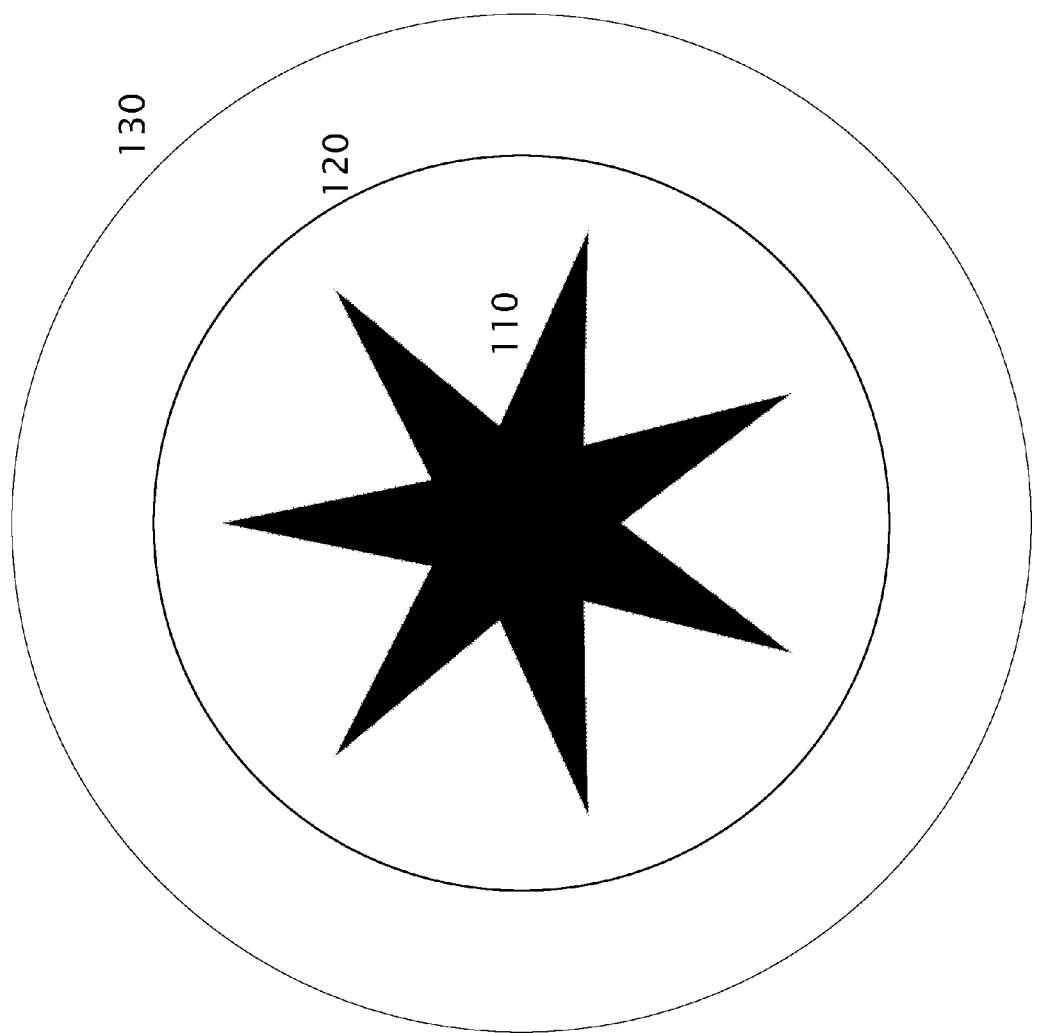
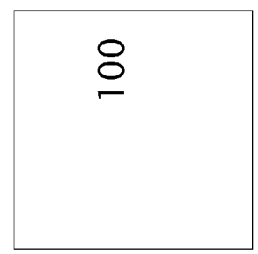
Fig. 1

MULTI-POLAR DC MACHINE

CROSS-REFERENCE TO RELATED APPLICATIONS

This application is a continuation of U.S. Ser. No. 14/572,412 filed Dec. 16, 2014, which is incorporated by reference herein as if included in its entirety.

BACKGROUND

Generating mechanical or electrical energy using a direct current machine has been known for several years. However, existing DC machines only exist for low-voltage systems, typically less than 700 volts. Higher voltage DC motors have not been available because of the physical constraints inherent in the standard DC motor. These physical constraints lead to excessive wear and arcing at medium and high voltages.

Further, existing motors have a fixed number of poles, which requires an owner to completely re-tool or replace an existing motor if operational requirements change, necessitating a motor with operating parameters requiring a different number of poles.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

The present application is directed to a system for generating mechanical energy by using direct current to cause at least one rotor to rotate within and/or around at least one stator and/or for generating electrical energy by using the rotation of at least one rotor within and/or around at least one stator to generate an electromagnetic field. The at least one rotor comprises a plurality of magnets oriented in an array perpendicular to the at least one rotor's axis of rotation. The at least one stator comprises a plurality of magnets oriented in a rectangular array around the at least one rotor. The magnets may be permanent magnets and/or electromagnets.

In one embodiment, at least one electromagnetic rotor is arranged to rotate within and/or around at least one magnetic stator. A controller is arranged to control the polarity of the rotor electromagnets such that the difference in polarity between a rotor electromagnet and a proximate stator magnet causes the rotor to rotate.

In one embodiment, at least one magnetic rotor is arranged to rotate within and/or around at least one electromagnetic stator. A controller is arranged to control the polarity of the stator electromagnets such that the difference in polarity between a rotor electromagnet and a proximate stator magnet causes the rotor to rotate.

In one embodiment, at least one electromagnetic rotor is arranged to rotate within and/or around at least one electromagnetic stator. A controller is arranged to control the polarity of the rotor and/or stator electromagnets such that the difference in polarity between a rotor electromagnet and a proximate stator electromagnet magnet causes the rotor to rotate.

In one embodiment, the controller is arranged to control the location of one or more rotors by forcing the one or more rotors to a known location.

In one embodiment, the controller is arranged to control the polarity of a plurality of electromagnets based on the orientation of one or more rotors, the orientation being determined based on the timing of the rotation of the one or more rotors.

In one embodiment, the controller is arranged to generate and/or convert rated rotor torque and/or speed from zero to a user-defined or automatically generated speed.

In one embodiment, the controller is arranged to control the polarity and/or strength of a plurality of electromagnets based on readings from a sensor arranged to detect the orientation of the at least one rotor.

In one embodiment, the controller is arranged to control the polarity and/or strength of a plurality of electromagnets based on a combination of readings from at least one sensor arranged to detect the orientation of the at least one rotor and the timing of the rotation of the at least one rotor.

In one embodiment, the controller is arranged to control the number of poles of the electromagnetic stator(s).

In one embodiment, the controller is arranged to control the number of poles of the electromagnetic rotor(s).

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 1 is a section view of a system for generating mechanical and/or electrical energy in accordance with one embodiment;

The depictions of rotor and stator magnets are for illustrative purposes only and are not intended to limit the spacing, shape, number, or location of rotor or stator magnets of an implementation within the scope of the present application.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. Further, various illustrated or described portions of processes may be re-ordered or executed in parallel in various different embodiments.

Although the present examples are described and illustrated herein as being partially implemented in a brushless DC motor, the system described is provided as an example and not a limitation. As those skilled in the art will appreciate, the present examples are suitable for application in a variety of different types of motors.

Although the present examples are described and illustrated herein as comprising a stator and at least one rotor, the system described is provided as an example and not a limitation. As those skilled in the art will appreciate, any number of rotors and/or stators may be used. In addition, each rotor and/or stator may have the same or a different number of magnets as any other rotor and/or stator.

At least one embodiment of the present application is directed to a system for generating mechanical and/or electrical energy by using direct current rating of at least 1 kV of electricity to cause at least one rotor to rotate within and/or around at least one stator. The at least one rotor comprises a plurality of magnets oriented in an array perpendicular to the at least one rotor's axis of rotation. The at least one stator comprises a plurality of magnets oriented in a rectangular array around and/or within the at least one rotor or in any other orientation that allows appropriate interaction with the rotor magnets. The magnets may be either permanent magnets or electromagnets. In one embodiment, the system comprises between 2 and 10 poles. In one embodiment, a plurality of rotors do not rotate at the same speed, but use electrical, mechanical, or hydraulic systems (including gears and/or a hydraulic clutch system) to rotate an optional shaft such that the plurality of rotors are rotating the shaft at the same speed.

FIG. 1 is a section view of a system for generating mechanical and/or electrical energy in accordance with one embodiment. The system includes a controller 100, which is described in greater detail below. The system also includes an inner rotor 110, a stator 120, and an outer rotor 130, as described above.

Figure 2:
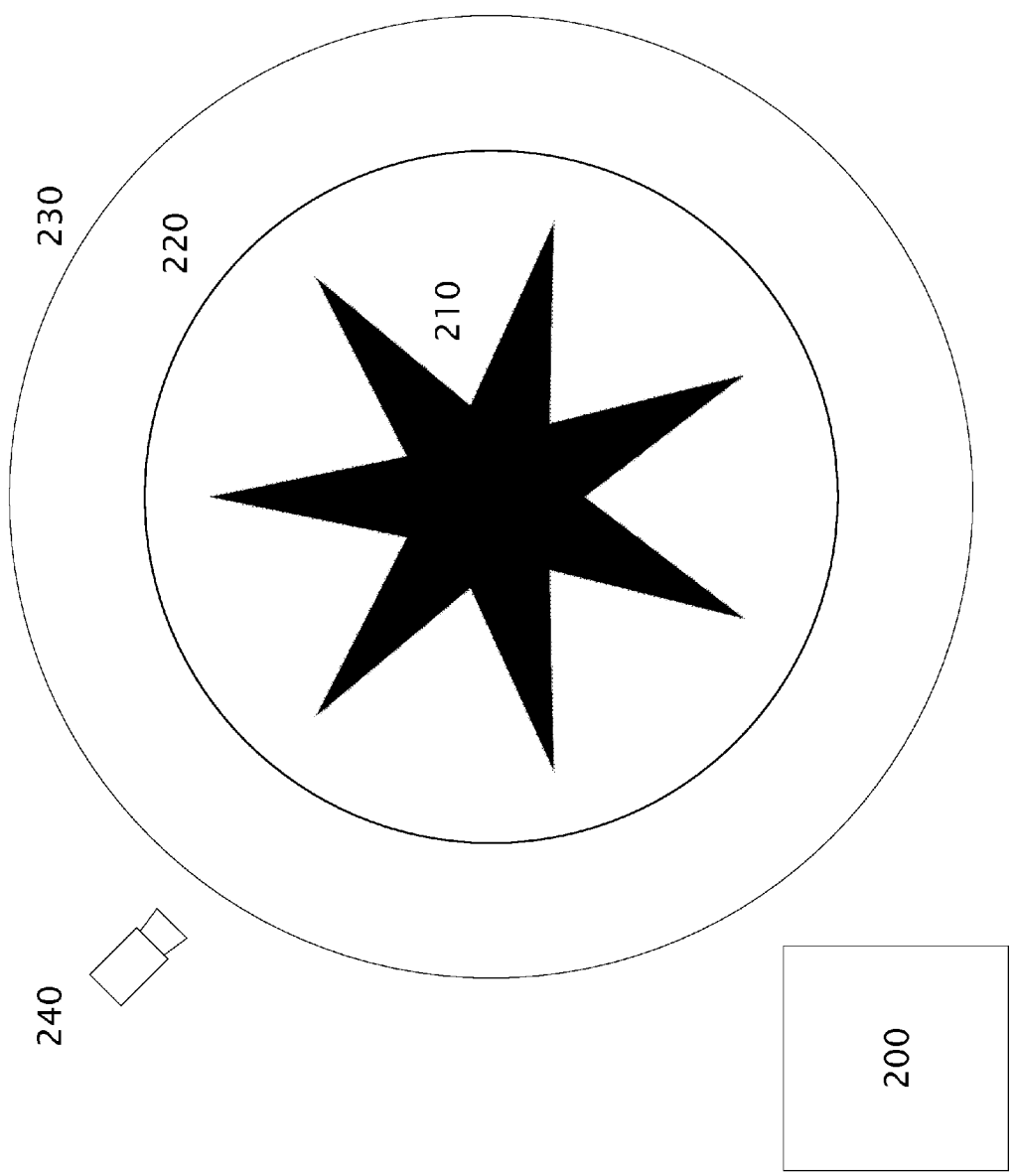
FIG. 2 is a section view of a system for generating mechanical and/or electrical energy comprising a sensor in accordance with one embodiment.

FIG. 2 is a section view of a system for generating mechanical and/or electrical energy comprising a sensor in accordance with one embodiment. The system includes a controller 200, inner rotor 210, stator 220, outer rotor 230, as well as a sensor 240 for providing information regarding the orientation of the rotors 210 and 230 to the controller 200. Sensor 240 may be an optical sensor (including an IR sensor, color sensor, or other visible light sensor), RFID tag scanner, QR code reader, vibration sensor, proximity sensor, motion detector, heat sensor, radiation sensor, magnetic switch, depth camera, or any other type of sensor. Sensor 240 can be located at any location on the machine and may be oriented such that the sensor line of sight is parallel to, perpendicular to, or at any other angle relative to the rotor axis of rotation. Although only one sensor 240 is shown, any number of sensors may be used. If more than one sensor 240 is used, the sensors may be co-located or located separately and may be oriented coaxially, or at different orientations relative to the rotor axis of rotation. The sensors may also be of the same or different types.

Figure 3:
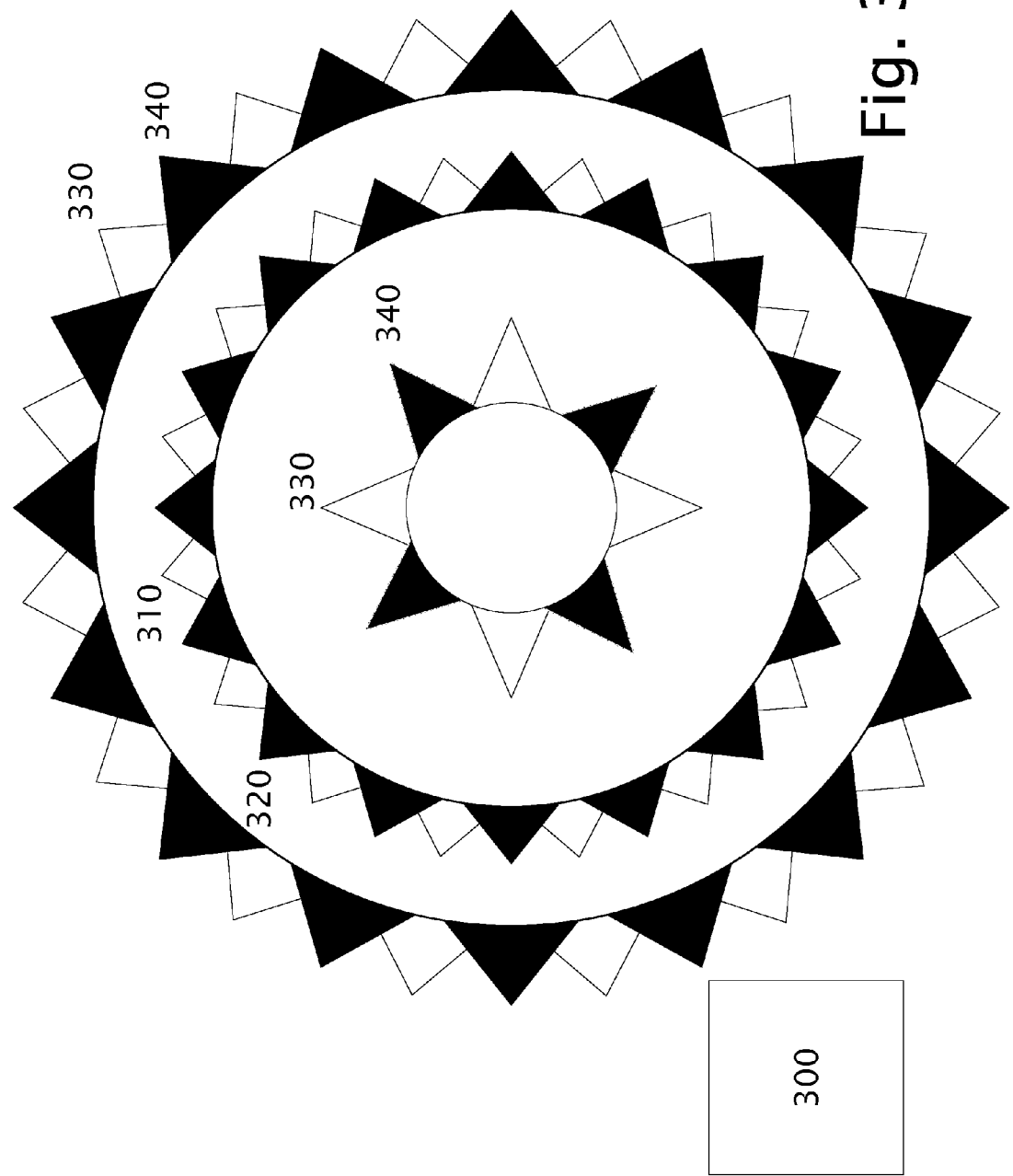
FIG. 3 is an illustration of a system for generating mechanical and/or electrical energy comprising rotor and stator magnets of alternating polarity in accordance with one embodiment.

FIG. 3 is an illustration of a system for generating mechanical and/or electrical energy comprising rotor and stator magnets of alternating polarity in accordance with one embodiment. The system includes a controller 300, stator magnets of polarity A 310, stator magnets of polarity B 320, rotor magnets of polarity A 330, and rotor magnets of polarity B 340. Either polarity A or polarity B may be positive or negative as long as polarity A and polarity B are both opposite at any given time. FIG. 3 shows the rotor and stator magnets alternating between polarity A and polarity B. However, this alternation is not always required.

Figure 4:
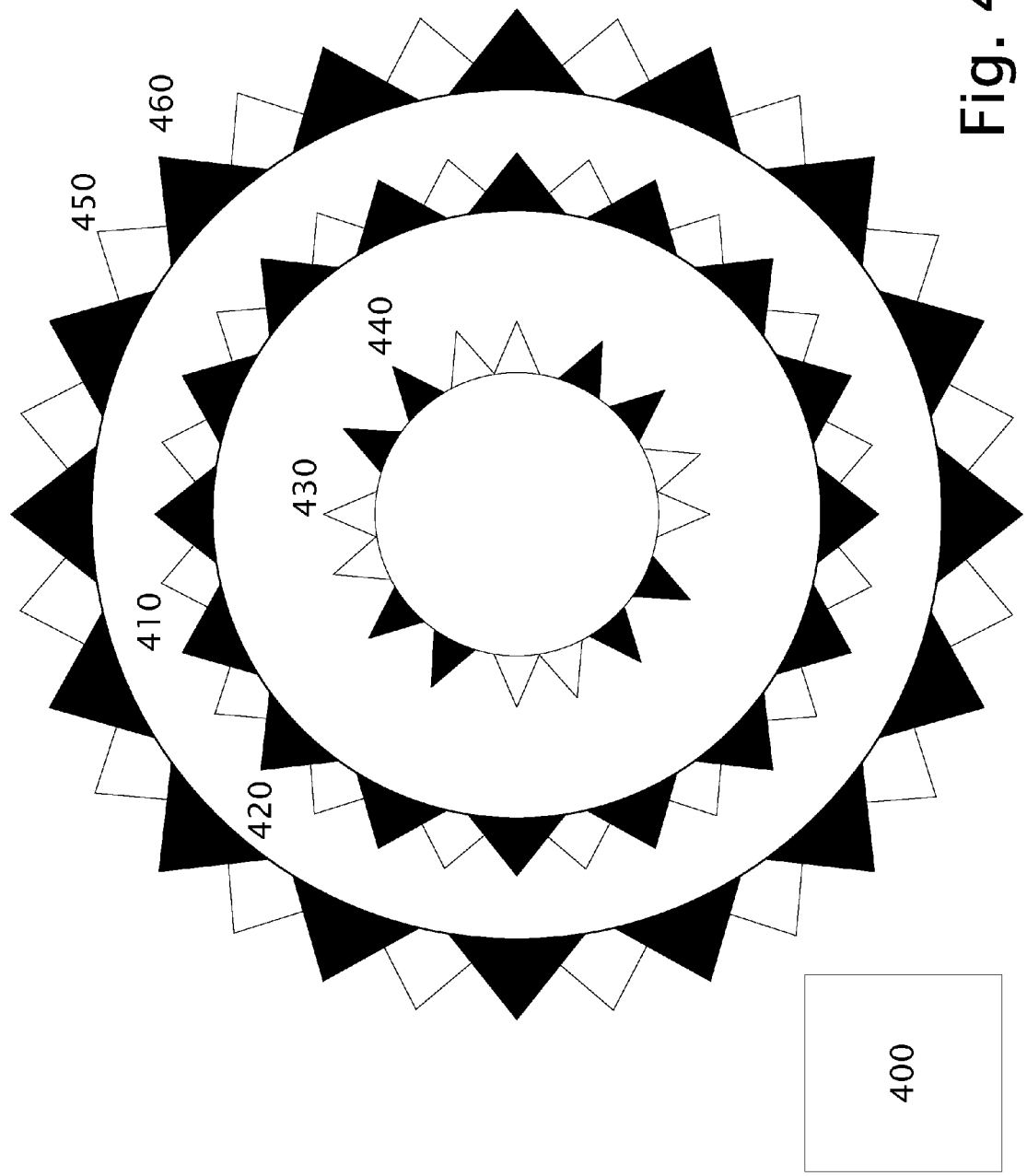
FIG. 4 is an illustration of a system for generating mechanical and/or electrical energy comprising stator magnets of alternating polarity and rotor magnets alternating polarity in groups in accordance with one embodiment.
Figure 7:
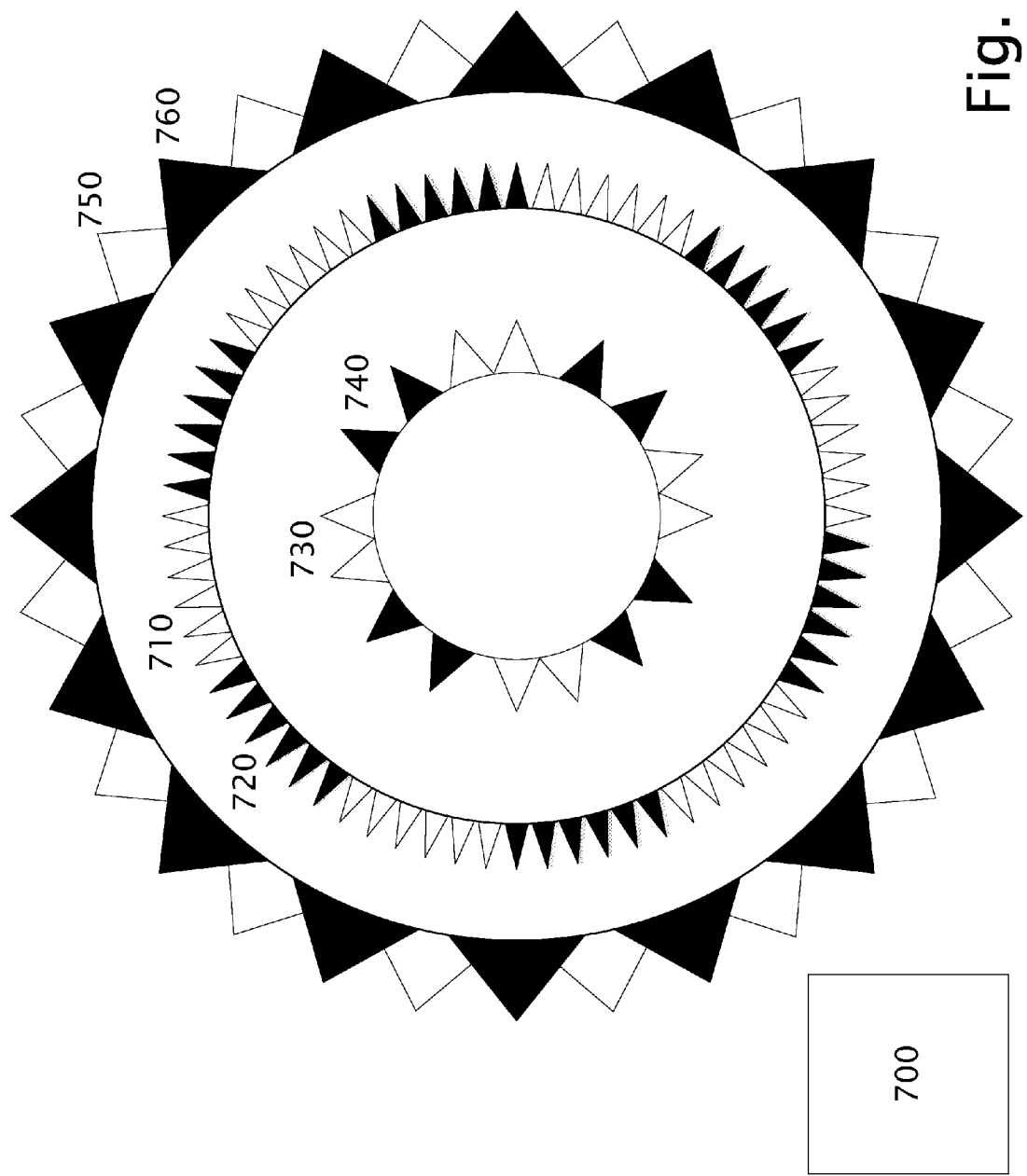
FIG. 7 is an illustration of a system for generating mechanical and/or electrical energy comprising rotor and stator magnets alternating polarity in groups in accordance with one embodiment.

FIG. 4 is an illustration of a system for generating mechanical and/or electrical energy comprising stator magnets of alternating polarity and rotor magnets alternating polarity in groups in accordance with one embodiment. The system includes a controller 400, stator magnets of polarity A 410, stator magnets of polarity B 420, inner rotor magnets of polarity A 430, inner rotor magnets of polarity B 440, outer rotor magnets of polarity A 450, and outer rotor magnets of polarity B 460. Unlike in FIG. 3, the inner rotor magnets 430 and 440 are arranged so that their polarity alternates in groups of two, although polarity groups of any number are possible. In some embodiments, the polarity groups are controlled by the controller. As shown in FIGS. 4 and 7, it is not necessary for the rotor and stator magnets to be arranged in polarity groups of the same number. The rotor and/or stator magnets may also comprise polarity groups of different numbers (for example, the rotor may comprise polarity groups of 1, 3, 5, and 6 magnets of the same polarity simultaneously). Similarly, systems with a plurality of rotors and/or stators may comprise polarity groups of different numbers of magnets between each of the plurality of rotors and/or stators (for example, an inner rotor may have polarity groups of 2 magnets while an outer rotor has polarity groups of 4 magnets). The controller may also be arranged to control the strength of a polarity group and/or the strength of individual magnets within a polarity group.

Figure 5:
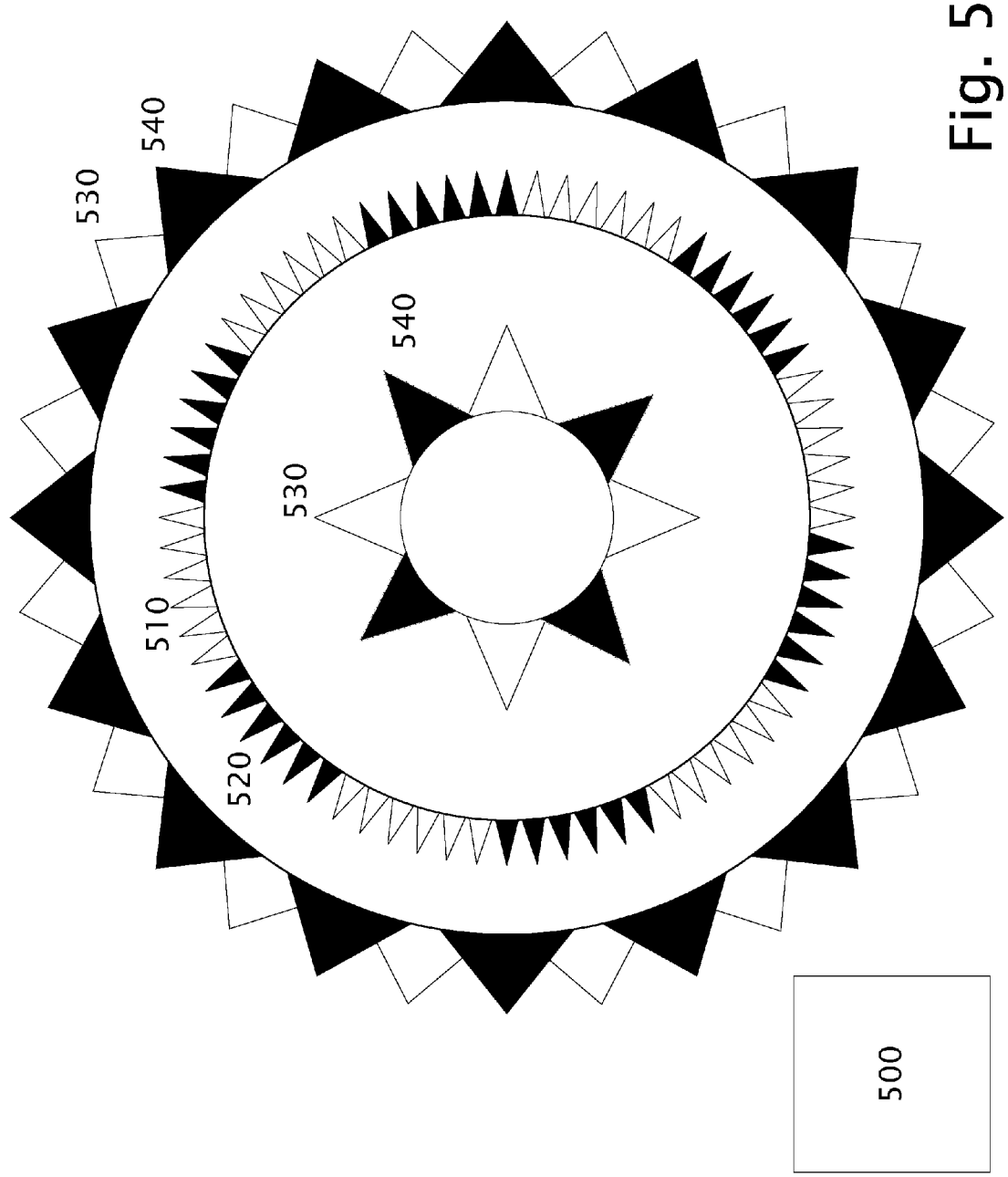
FIG. 5 is an illustration of a system for generating mechanical and/or electrical energy comprising rotor magnets of alternating polarity and stator magnets alternating polarity in groups in accordance with one embodiment.

FIG. 5 is an illustration of a system for generating mechanical and/or electrical energy comprising rotor magnets of alternating polarity and stator magnets alternating polarity in groups in accordance with one embodiment. The system includes a controller 500, stator magnets of polarity A 510, stator magnets of polarity B 520, rotor magnets of polarity A 530, and rotor magnets of polarity B 540. Unlike in FIGS. 3 and 4, the stator magnets 510 and 520 are arranged so that their polarity alternates in groups of six, although polarity groups of any number are possible as shown in FIG. 6.

Figure 6:
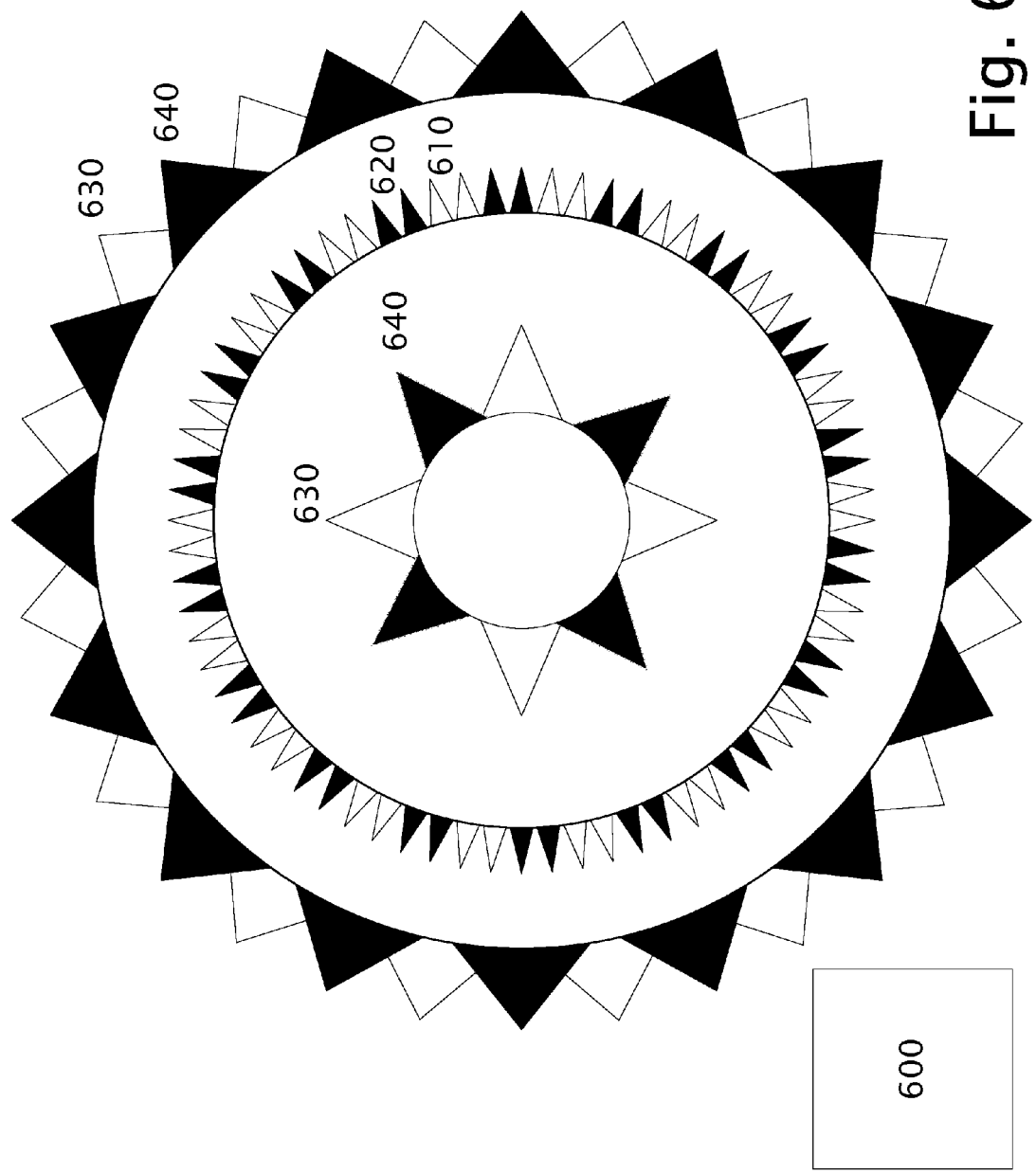
FIG. 6 is an illustration of a system for generating mechanical and/or electrical energy comprising rotor magnets of alternating polarity and stator magnets alternating polarity in groups in accordance with one embodiment.

FIG. 6 is an illustration of a system for generating mechanical and/or electrical energy comprising rotor magnets of alternating polarity and stator magnets alternating polarity in groups in accordance with one embodiment. The system includes a controller 600, stator magnets of polarity A 610, stator magnets of polarity B 620, rotor magnets of polarity A 630, and rotor magnets of polarity B 640. Unlike in FIG. 5, the stator magnets 610 and 620 are arranged so that their polarity alternates in groups of two, although polarity groups of any number are possible, as discussed above.

It is not necessary for the polarity groups of the at least one stator and at least one rotor to comprise the same number of magnets. FIG. 7 is an illustration of a system for generating mechanical energy comprising rotor and stator magnets alternating polarity in groups in accordance with one embodiment. The system includes a controller 700, stator magnets of polarity A 710, stator magnets of polarity B 720, inner rotor magnets of polarity A 730, inner rotor magnets of polarity B 740, outer rotor magnets of polarity A 750, and outer rotor magnets of polarity B 760. The stator magnets 710 and 720 are arranged so that their polarity alternates in groups of six, the inner rotor magnets 730 and 740 are arranged so that their polarity alternates in groups of two, and the outer rotor magnets 750 and 760 are arranged so that their polarity alternates in groups of one.

Figure 8:
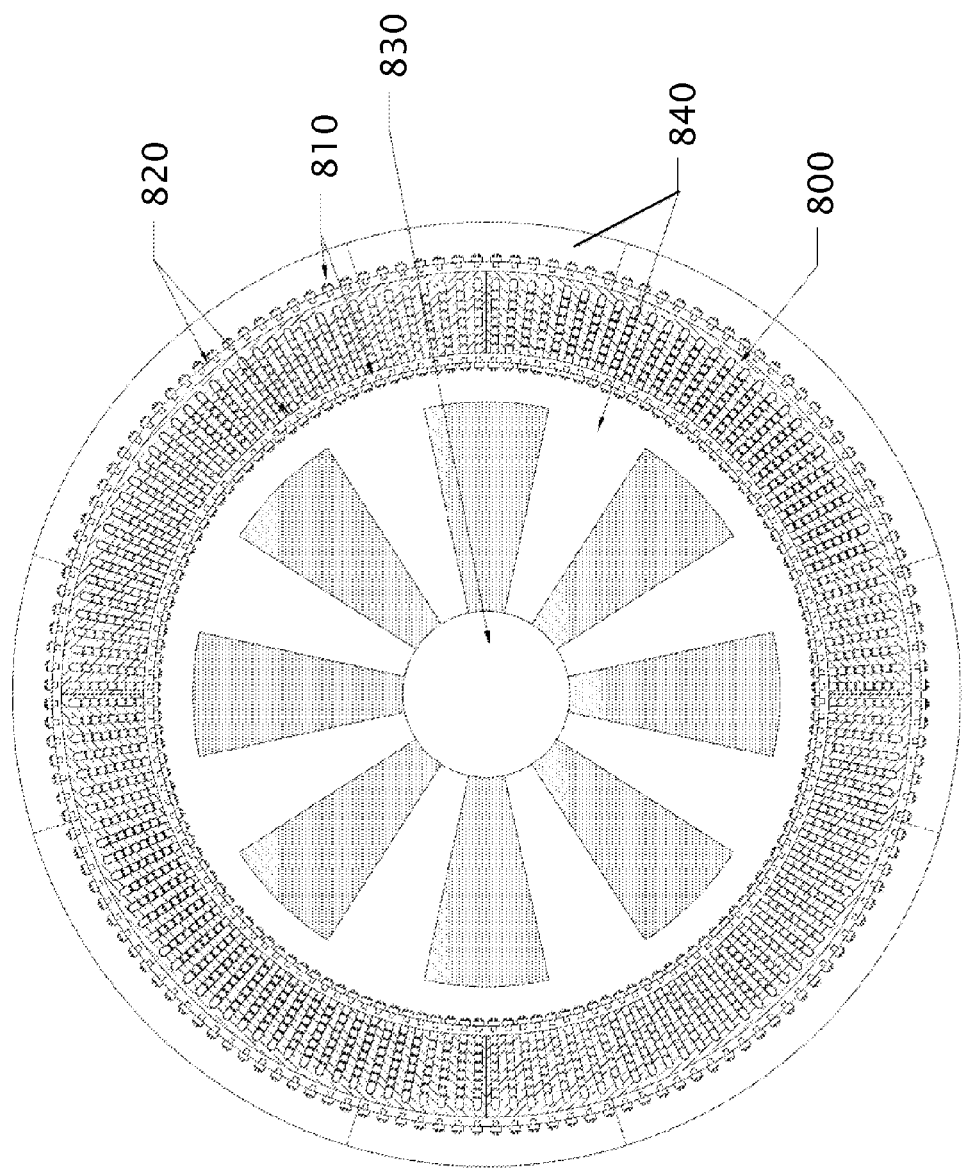
FIG. 8 is a detailed section view taken perpendicular to a rotor's axis of rotation of a system for generating mechanical and/or electrical energy comprising an electromagnetic stator in accordance with one embodiment.

FIG. 8 is a detailed section view of an embodiment taken perpendicular to the rotor's axis of rotation. In this embodiment, the stator 800 comprises a plurality of electromagnets 810 separated from each other by a fixed gap 820 and oriented in an array around the axis of rotation of a rotor 830 such that a gap 840 exists between the rotor(s) and stator(s). The gap 840 may be filled with air or any other gas. As discussed above and in more detail below, a controller may be arranged to control the polarity and strength of the electromagnets 810, including controlling polarity grouping and number of poles of the electromagnets 810. The controller may also be arranged to control the orientation of the rotor relative to the stator, as discussed in more detail below. While the fixed gap 820 is shown as being identical for each electromagnet 810, this is for simplicity only and the gaps may vary from one electromagnet 810 to the next.

Figure 9:
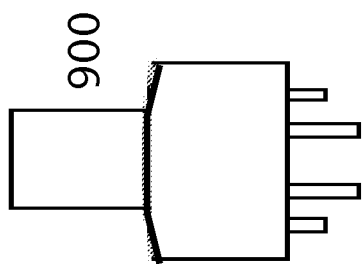
FIG. 9 is a detailed view of a pole unit of a system for generating mechanical and/or electrical energy comprising at least one electromagnetic rotor in accordance with one embodiment.

FIG. 9 is a detailed view of a field pole unit 900 of an embodiment. Field pole units may be attached to the rotor(s) and/or stator(s) individually or in groups such that each individual or group of pole units 900 may be removed or replaced without removing or replacing all of the pole units 900 in the rotor(s) and/or stator(s). The pole units 900 may be attached by slot, rivet, plug, latch, screw, hinge, or any other appropriate method or combination of methods. A controller may be arranged to detect when an individual pole unit 900 or group of pole units is disconnected or when the connection becomes loose. The controller may be further arranged to emit a signal upon detecting a missing or loose pole unit 900 or group of pole units. Such a signal may be visual or audio or both.

Figure 10:
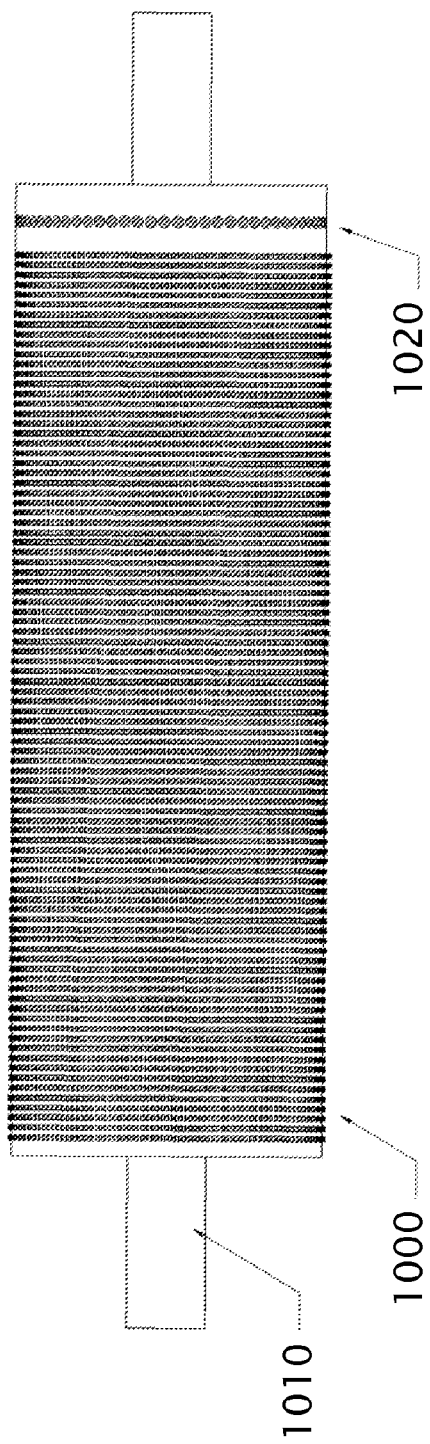
FIG. 10 is a detailed view of the rotor of a system for generating mechanical and/or electrical energy comprising at least one electromagnetic rotor in accordance with one embodiment.

FIG. 10 is a detailed view of a rotor of an embodiment. The rotor comprises a plurality of magnets 1000 oriented in an array around the rotor's axis of rotation 1010 and a brushless exciter 1020. As discussed above and in more detail below, a controller may be arranged to control the polarity and strength of the rotor magnets 1000, including controlling the polarity grouping and number of poles of the rotor.

Figure 11:
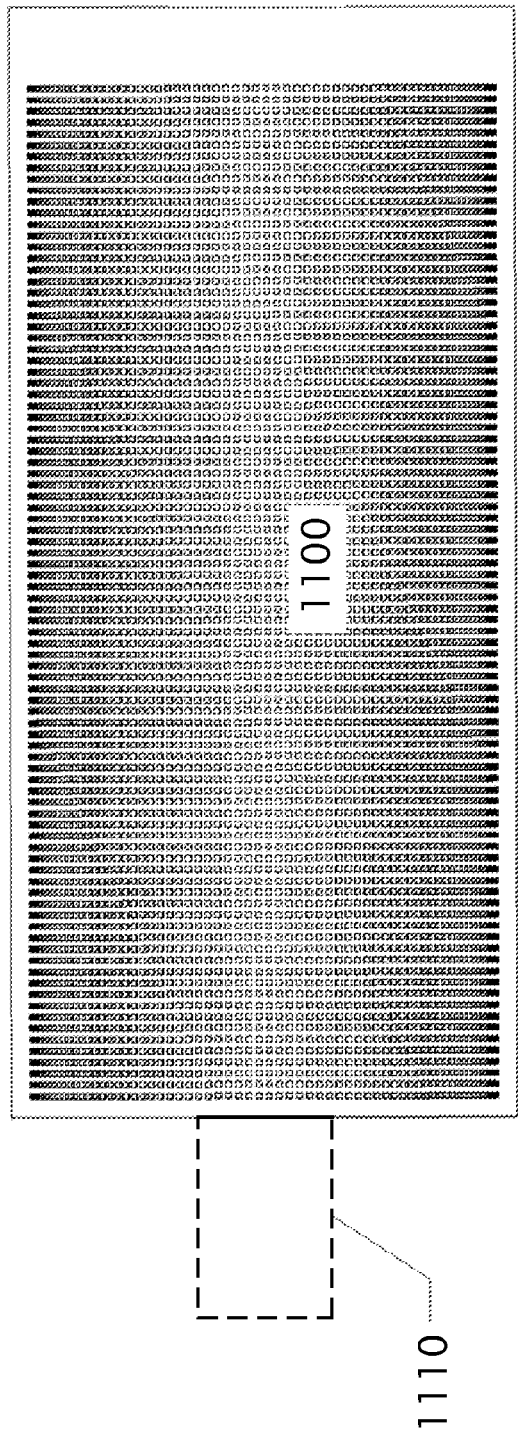
FIG. 11 is a detailed section view taken along a rotor's axis of rotation of the interior of the rotor housing of a system for generating mechanical and/or electrical energy comprising an electromagnetic stator in accordance with one embodiment.

FIG. 11 is a detailed section view of the rotor housing of an embodiment taken along a rotor's axis of rotation. The rotor housing comprises a plurality of stator magnets 1100 oriented in an array around the rotor's axis of rotation. As discussed above and in more detail below, a controller may be arranged to control the polarity and strength of the rotor magnets 1100, including controlling the polarity grouping and number of poles of the stator(s). The controller may also be arranged to control the orientation of the rotor and/or rotor fields within the housing, as discussed in more detail below. The rotor housing may also comprise one or more sensors of the same or different types, as discussed above. The rotor may also comprise a shaft 1110.

Figure 12:
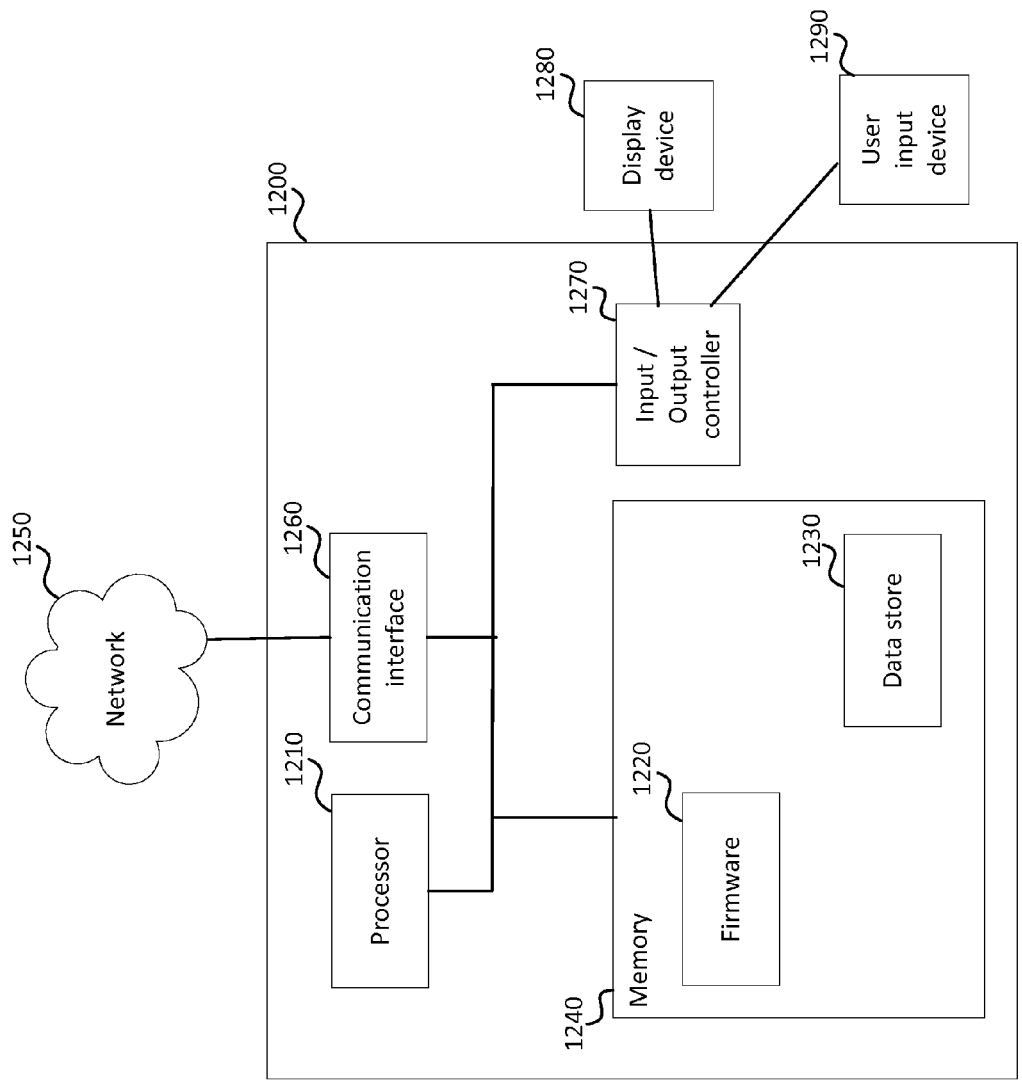
FIG. 12 is a visual representation of a computing device in accordance with one embodiment.

In one embodiment, the magnets of at least one rotor are electromagnets. In another embodiment, the magnets of at least one stator are electromagnets. In yet another embodiment, the magnets of both the rotor(s) and stator(s) are electromagnets. All electromagnets are controlled by a controller, which is arranged to control the polarity of all of the electromagnets individually. The controller may comprise a computing system as shown in FIG. 12, described in more detail below. The controller is arranged to receive inputs regarding the physical, mechanical, and electrical properties of the system through manual data entry, by downloading information from a wired or wireless network, accessing data stored at some other part of the system (for example, a memory located at a rotor, a stator, another controller, or another computer connected to the system), accessing data stored on a permanent or removable memory disk, or any other suitable method of receiving data.

In one embodiment, the controller is connected to the coil of every electromagnet in the system. The controller changes the polarity of every electromagnet individually by reversing the direction of the flow of direct current through the coil. The controller controls the polarity of the electromagnets of the rotor(s) and/or stator(s) such that attractive and/or repulsive forces caused at least in part by the difference in polarity between a rotor magnet or electromagnet and a proximate stator magnet or electromagnet causes the rotor to rotate.

Figure 13:
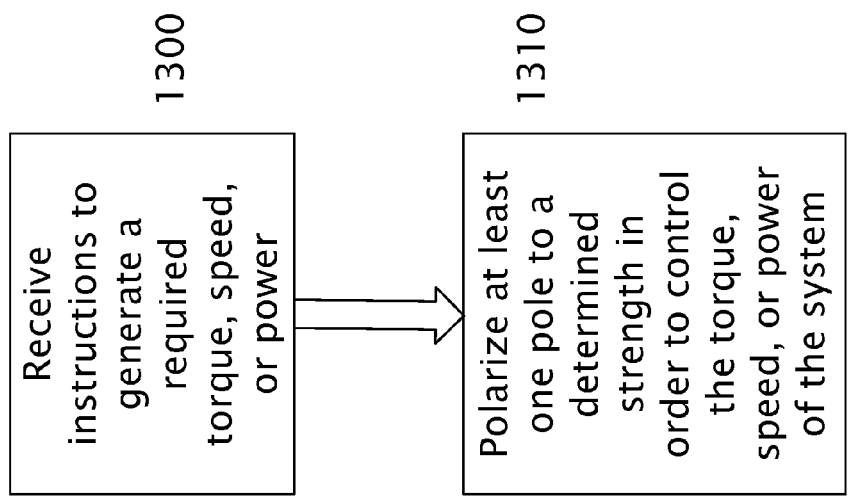
FIG. 13 is a flow chart of a method for controlling torque, speed or power in a system for generating mechanical and/or electrical energy in accordance with one embodiment.

In one embodiment, the controller is arranged to control the mechanical and/or electrical energy generated by the system. FIG. 13 is a flow chart of a method for controlling torque, speed or power in a system for generating mechanical and/or electrical energy in accordance with one embodiment. The method of FIG. 13 comprises: a controller receiving instructions 1300 to control the system to generate a required torque, speed, or power; polarizing 1310 at least one pole to a determined strength in order to control the torque, speed, or power of the system.

Figure 14:
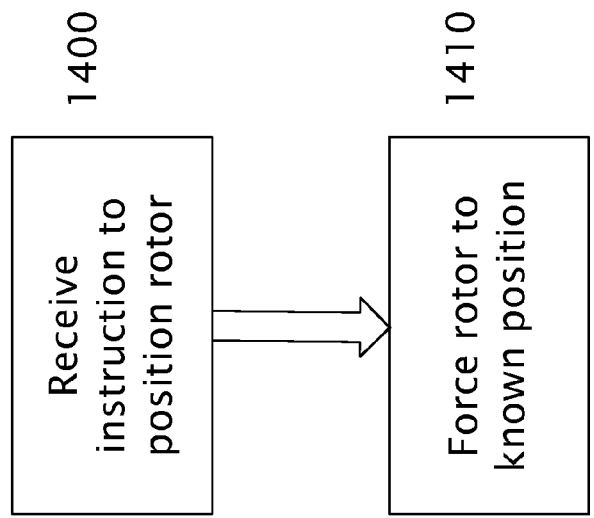
FIG. 14 is a flow chart of a method for positioning at least one rotor in a system for generating mechanical and/or electrical energy in accordance with one embodiment.

In one embodiment, in order to appropriately control the polarity of the electromagnets, the controller is able to determine the current and future position of the rotor(s) and the associated magnets relative to the stator(s) and the associated magnets. FIG. 14 is a flow chart of a method for positioning at least one rotor in a system for generating mechanical and/or electrical energy in accordance with one embodiment. The method of FIG. 14 comprises: a controller receiving an instruction 1400 to position a rotor a certain way. The controller then forces 1410 the rotor to a known position. This movement of the rotor can be performed by the controller manipulating the polarity of the electromagnets to move the rotor to the prescribed orientation through the attractive and/or repulsive forces generated by the magnets. The movement of the rotor can also be accomplished by attaching a separate motor to the shaft of the rotor and enabling the controller to control the operation of the separate motor to turn the rotor shaft to the desired orientation. The method of FIG. 14 may be performed for a plurality of rotors simultaneously.

Figure 15:
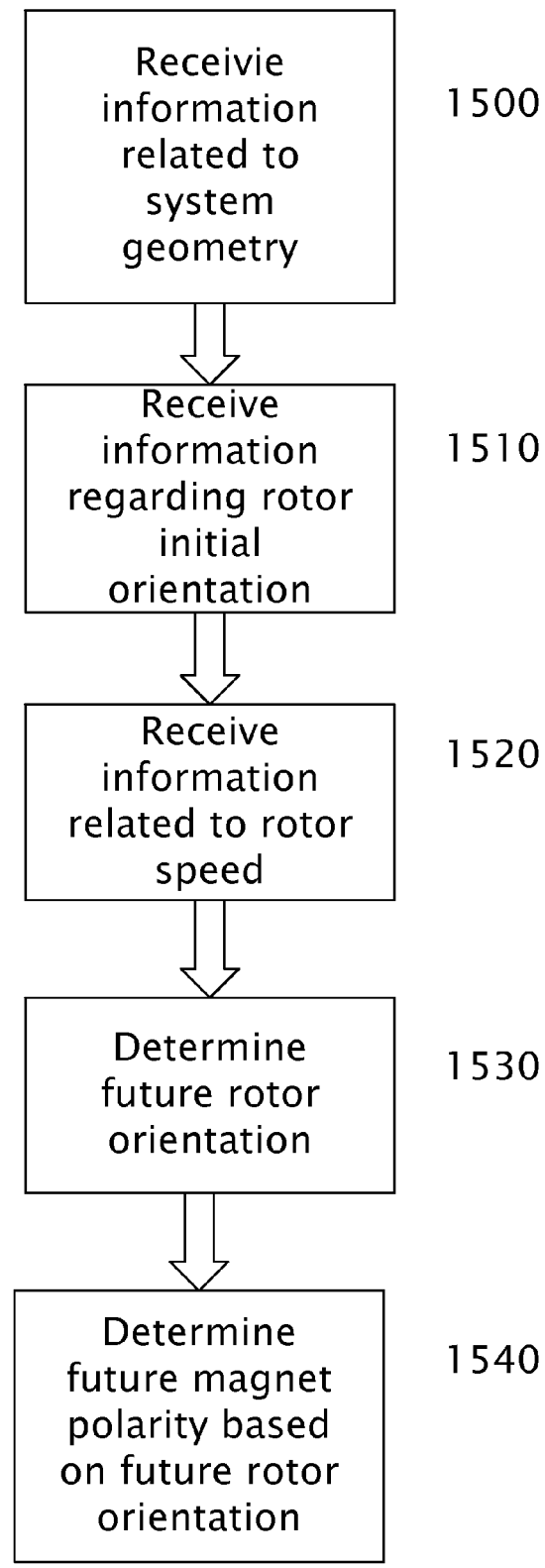
FIG. 15 is a flow chart of a method for controlling the polarity of a plurality of electromagnets based on the timing of the rotation of the at least one rotor of a system for generating mechanical and/or electrical energy in accordance with one embodiment.

FIG. 15 is a flow chart of a method for controlling the polarity of a plurality of electromagnets based on the timing of the rotation of a rotor of a system for generating mechanical and/or electrical energy in accordance with one embodiment. The method of FIG. 15 comprises: a controller receiving 1500 information regarding the geometry of the system, as discussed above; the controller receiving 1510 information regarding the initial rotor orientation, possibly using the method of FIG. 14, although other methods may be used, such as receiving a manual user input of the initial rotor orientation; the controller receiving 1520 information regarding the rotational speed of the rotor, this information may be received via manual user input, a mechanical or electronic speed measuring device attached to the rotor shaft, or any other appropriate method; and the controller determining 1530 a future rotor orientation using any appropriate mathematical technique involving the information 1500 related to the geometry of the system, manual input from a user, or any other appropriate method; and the controller determining 1540 a future polarity of the electromagnets of the system such that the attractive and/or repulsive forces generated by the future polarities cause the rotor to rotate based on the rotor's determined 1530 future position. The method of FIG. 15 may be performed for a plurality of rotors simultaneously.

Figure 16:
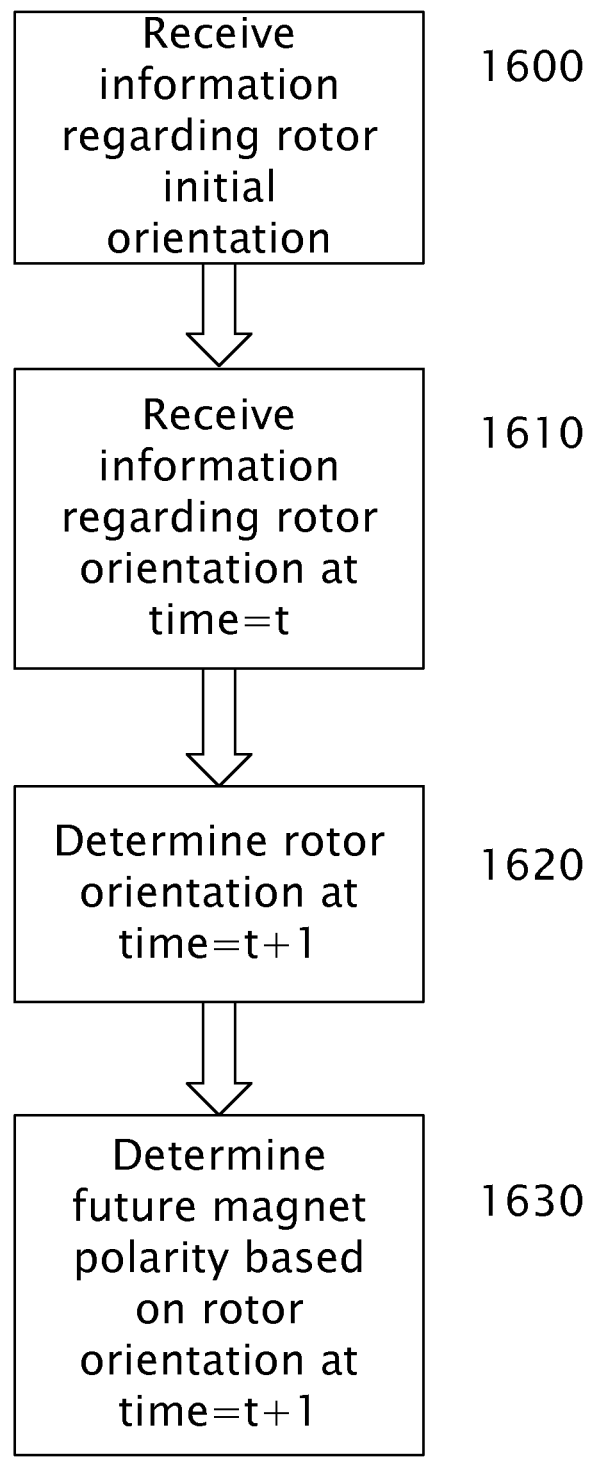
FIG. 16 is a flow chart of a method for controlling the polarity of a plurality of electromagnets based on readings from a sensor arranged to detect the orientation of the at least one rotor of a system for generating mechanical and/or electrical energy in accordance with one embodiment.

FIG. 16 is a flow chart of a method for controlling the polarity of a plurality of electromagnets based on readings from a sensor arranged to detect the orientation of a rotor of a system for generating mechanical and/or electrical energy in accordance with one embodiment. The method of FIG. 16 comprises: a controller receiving 1600 information regarding an initial orientation of the rotor, the information being received from one or more sensors, through manual user input, using the method of FIG. 14, or through any other appropriate means; the controller receiving 1610 information regarding orientation of the rotor at time=t, the information being received from the one or more sensors, through manual user input, or through any other appropriate means; the controller determining 1620 an orientation of the rotor at time=t+1, the determination being based on input from the one or more sensors, manual user input, rotational speed of the rotor calculated based on input from the one or more sensors or manual user input, or any other appropriate means; and the controller determining 1630 a future polarity of the electromagnets of the system such that the future polarities cause the rotor to rotate at the desired rate based on the rotor's determined 1620 position at time=t+1. The method of FIG. 16 may be performed for a plurality of rotors simultaneously.

Figure 17:
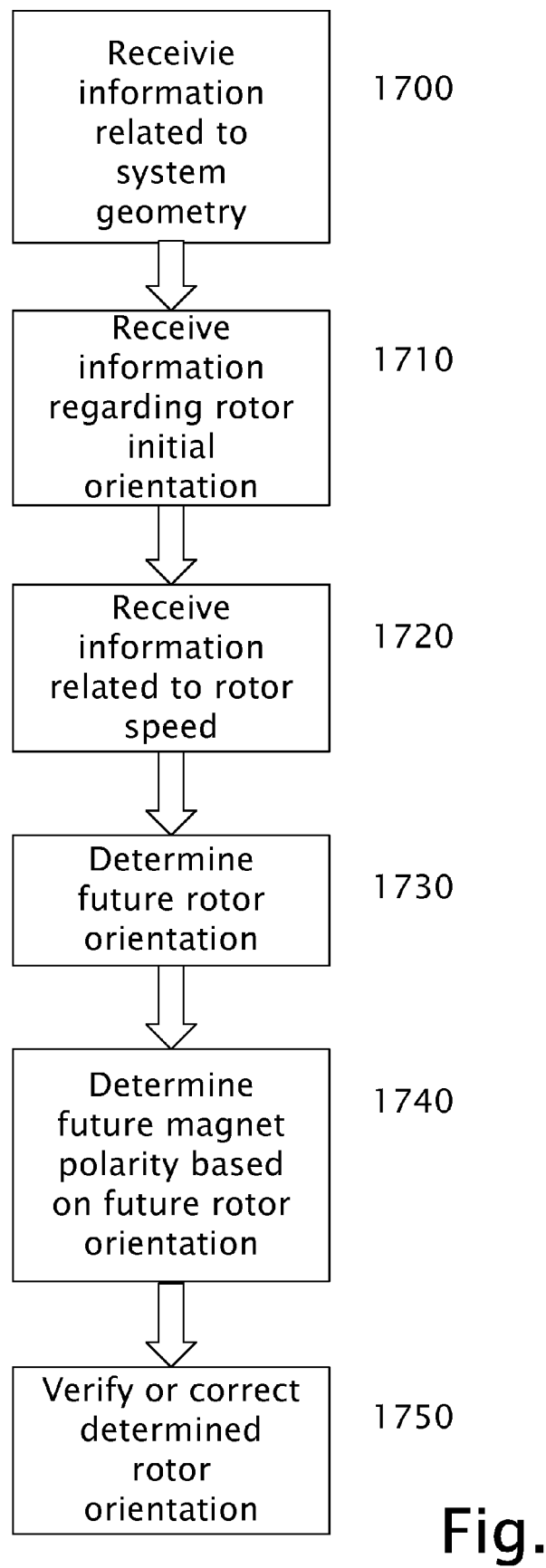
FIG. 17 is a flow chart of a method for controlling the polarity of a plurality of electromagnets based on a combination of the timing of the rotation of the at least one rotor and readings from a sensor arranged to detect the orientation of the at least one rotor of a system for generating mechanical and/or electrical energy in accordance with one embodiment.

FIG. 17 is a flow chart of a method for controlling the polarity of a plurality of electromagnets based on a combination of the timing of the rotation of a rotor and readings from a sensor arranged to detect the orientation of the rotor of a system for generating mechanical and/or electrical energy in accordance with one embodiment. The method of FIG. 17 comprises: a controller receiving 1700 information regarding the geometry of the system, as discussed above; the controller receiving 1710 information regarding the initial rotor orientation, possibly using the method of FIG. 14, although other methods may be used, such as receiving a manual user input of the initial rotor orientation or receiving input from one or more sensors; the controller receiving 1720 information regarding the rotational speed of the rotor, this information may be received via manual user input, a mechanical or electronic speed measuring device attached to the rotor shaft, input from the one or more sensors, or any other appropriate method; the controller determining 1730 a future rotor orientation using any appropriate mathematical technique involving the information 1700 related to the geometry of the system, input from the one or more sensors, manual input from a user, or any other appropriate method; the controller determining 1740 a future polarity of the electromagnets of the system such that the future polarities cause the rotor to rotate at the desired rate based on the rotor's determined 1730 future orientation; and the controller verifying 1750 the determined 1730 future orientation of the rotor using input from the one or more sensors or any other appropriate method. The controller may also update or modify the methods used to determine 1730 the rotor's future orientation if the verification 1750 fails.

In one embodiment the controller is arranged to control the number of electromagnetic rotor and/or stator poles.

In one embodiment the controller is arranged to control the polarity of each electromagnet and the number of electromagnetic poles of the rotor(s) and/or stator(s) by controlling the direction of direct current flowing through each electromagnetic coil. The controller may be further arranged to control the strength of the electromagnetic poles of the rotor(s) and/or stator(s) and/or the strength of individual electromagnets of the rotor(s) and/or stator(s) by controlling the amount of current sent through the electromagnetic coils. The amount and directions of current sent through the electromagnetic coils are based on a current pattern created by the controller. The current pattern comprises information regarding the amount and direction of direct current flow for each electromagnet at each time interval. The time interval may be specified by a user, pre-programmed by a manufacturer, or calculated by the controller based on operating criteria for the system.

In one embodiment the controller may be distributed across a plurality of physical devices connected via a wired or wireless network.

In one embodiment, the controller comprises two separate devices connected by a wired or wireless network. The first device comprises appropriate hardware and software for receiving and processing data related to the operation of the system, including setting the system's operating voltage, RPMs, output torque, number of rotor or stator poles, or any other appropriate parameters. The first device may also comprise a user input interface (such as a mouse, keyboard, or NUI device), 2D or 3D display interface, output devices such as 2D or 3D printers, or any combination thereof. The first device is also arranged to provide to a user a range of acceptable operating parameters based on the physical specifications of the system and to provide visual, audio, or other feedback to a user if the user attempts to arrange the system to operate outside of the acceptable operating parameters. In a case where a user requests one or more target output parameter(s), this feedback may include a description of the physical specification(s) or operating parameter(s) that need to be modified in order to achieve the desired target parameter(s). The second device comprises the appropriate hardware and software for switching the polarity of each electromagnet and controlling the number of electromagnetic poles of the rotor(s) and/or stator(s) based on a current pattern created by the first device (in some alternative embodiments, the current pattern may be created by the second device based on other inputs from the first device).

In one embodiment, the second device may comprise two or more physically separate devices, one attached to the electromagnets of the stator(s) and one attached to the electromagnets of the rotor(s). The first device may communicate with a rotor-mounted second device through a wired or wireless connection (including using optical transmitters and receivers oriented coaxially with, perpendicular to, or at any other orientation relative to the rotor's axis of rotation; radio signals; other electromagnetic waves; and any other appropriate method). The first device may also communicate with the second device by manipulating one or more electromagnets of the rotor(s) and/or stator(s) to generate a binary signal.

In one embodiment, the controller is arranged to detect one or more malfunctioning rotor and/or stator magnet(s) and to generate and implement a current pattern to compensate for the malfunctioning magnet(s). The controller may detect a malfunctioning electromagnet of the rotor(s) and/or stator(s) by varying the direction and/or amount of current to one or more rotor and/or stator electromagnets and evaluating whether or not the system responds as expected. System response can be measured based on the rotational speed or orientation of the rotor, or based on data collected by one or more sensors attached to the rotor(s) and/or stator(s). This process can also be used to calibrate the rotor(s), stator(s), controller, or any combination thereof.

FIG. 12 illustrates various components of an exemplary computing-based device 1200 which may be implemented as any form of a computing and/or electronic device, and in which embodiments of a controller may be implemented.

Computing-based device 1200 comprises one or more processors 1210 which may be microprocessors, controllers or any other suitable type of processors for processing computer executable instructions to control the operation of the device. In some examples, for example where a system on a chip architecture is used, the processors 1210 may include one or more fixed function blocks (also referred to as accelerators) which implement a part of controlling one or more embodiments discussed above. Firmware 1220 or an operating system or any other suitable platform software may be provided at the computing-based device 1200. Data store 1230 is available to store sensor data, parameters, logging regimes, and other data.

The computer executable instructions may be provided using any computer-readable media that is accessible by computing based device 1200. Computer-readable media may include, for example, computer storage media such as memory 1240 and communications media. Computer storage media, such as memory 1240, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but signals per se, propagated or otherwise, are not examples of computer storage media. Although the computer storage media (memory 1240) is shown within the computing-based device 1200 it will be appreciated that the storage may be distributed or located remotely and accessed via a network 1250 or other communication link (e.g. using communication interface 1260).

The computing-based device 1200 also comprises an input/output controller 1270 arranged to output display information to a display device 1280 which may be separate from or integral to the computing-based device 1200. The display information may provide a graphical user interface. The input/output controller 1270 is also arranged to receive and process input from one or more devices, such as a user input device 1290 (e.g. a mouse, keyboard, camera, microphone, or other sensor). In some examples the user input device 1290 may detect voice input, user gestures or other user actions and may provide a natural user interface. This user input may be used to change parameter settings, view logged data, access control data from the device such as battery status and for other control of the device. In an embodiment the display device 1280 may also act as the user input device 1290 if it is a touch sensitive display device. The input/output controller 1270 may also output data to devices other than the display device, e.g. a locally connected printing device. The input/output controller 1270 may also connect to various sensors discussed above, and may connect to these sensors directly or through the network 1250.

The input/output controller 1270, display device 1280 and optionally the user input device 1290 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments and/or combine any number of the disclosed embodiments without departing from the spirit or scope of this specification.

What is claimed:

1. A method, said method comprising the steps of:
receiving, at a control system of a brushless DC machine receiving at least 2 kV of electricity, information from at least one sensor about properties of electromagnets located in a plurality of rotors and stators,
sending commands from the control system to the electromagnets regarding at least one of the properties of the electromagnets of the stators and the rotors based on the information received from the at least one sensor, wherein the electromagnets of the stators and the rotors are configured so that the polarity and/or the strength of the electromagnets differ,
such that said brushless DC machine is optimized for generation of mechanical and/or electrical energy.

2. The method of claim 1 wherein said information from said at least one sensor is selected from a group consisting of current patterns among the electromagnets, poles of the electromagnets, voltage of the electromagnets, polarity of the electromagnets, relative location of the rotor electromagnets to the stator electromagnets, orientation of the rotor electromagnets, timing of rotation of the rotor electromagnets, number of the poles, strength of the electromagnets, temperature of the electromagnets, vibration of the electromagnets and existence of a loose, malfunctioning or missing electromagnet.

3. The method of claim 2 wherein the poles of the electromagnets of the rotors and the stators are configured in groups which differ.

4. A method, said method comprising the steps of:
receiving, at a control system of a brushless DC machine receiving at least 2 kV of electricity, information from at least one sensor about properties of a plurality of rotors and stators,
sending commands from the control system to electromagnets located in the rotors or the stators regarding at least one of the properties of the stators and the rotors based on the information received from the at least one sensor, wherein the electromagnets of the stators and the rotors are configured so that the polarity and/or the strength of the electromagnets differ,
such that said brushless DC machine is optimized for generation of mechanical and/or electrical energy.

5. The method of claim 4 wherein said information from said at least one sensor is selected from the group consisting of rotor torque, rotor speed, rotor orientation, electromagnet temperature, electromagnet strength, electromagnet vibration, current patterns among the electromagnets, pole of the electromagnets, voltage of the electromagnets, polarity of the electromagnets, relative location of the rotor electromagnets to the stator electromagnets, orientation of the rotor electromagnets, and timing of rotation of the rotor electromagnets.

6. The method of claim 4 wherein said commands from said control system to the electromagnets are selected from the group consisting of current patterns among the electromagnets, pole of the electromagnets, voltage of the electromagnets, polarity of the electromagnets, relative location of the rotor electromagnets to the stator electromagnets, orientation of the rotor electromagnets, timing of rotation of the rotor electromagnets, number of poles, strength of the electromagnets, temperature of the electromagnets or vibration of the electromagnets.

7. A method at a brushless DC machine comprising the steps of:
  receiving, at the brushless DC machine, at least 2 kV of electricity;
  determining positions of a plurality of rotors comprising electromagnets relative to a plurality of stators comprising electromagnets, data on the positions being generated by at least one sensor;
  sending said data on the positions to a control system,
  receiving, by the rotors and the stators from the control system,
  commands regarding current patterns affecting polarity and/or strength of the electromagnets, the current patterns being based at least in part on the position of the rotors, and
  modifying the polarity and/or the strength of the electromagnets of at least a portion of the rotors and the stators.

8. The method of claim 7, wherein the at least one sensor is at least one optical sensor.

9. The method of claim 7, further comprising receiving, from the control system, said current patterns that modify a number of poles of the stators.

10. The method of claim 7, wherein the electromagnets of the stators are arranged in an array comprising a plurality of rows and columns and are attached to a rotor housing.

11. The method of claim 8, wherein the current patterns modify the polarity and/or the strength of the electromagnets of the rotor.

12. The method of claim 7, wherein the current patterns modify the polarity and/or the strength of electromagnets of the stator.

13. The method of claim 7, further comprising determining the position of the rotors by forcing the rotors to known positions.

14. A brushless DC machine, comprising:
  a control system configured to receive information from at least one sensor about properties of electromagnets located in a plurality of rotors and stators, said control system also configured to send commands to said electromagnets based on the information received from the at least one sensor, wherein the electromagnets of the stators and the rotors are configured so that the polarity and/or the strength of the electromagnets differ, such that said brushless DC machine receives at least 2 kV of electricity and is optimized for generation of mechanical and/or electrical energy.

15. The machine as in claim 14, wherein said information is selected from a group consisting of current patterns among the electromagnets, poles of the electromagnets, voltage of the electromagnets, polarity of the electromagnets, relative location of the rotor electromagnets to the stator electromagnets, orientation of the rotor electromagnets, timing of rotation of the rotor electromagnets, number of the poles, strength of the electromagnets, temperature of the electromagnets, vibration of the electromagnets and existence of a loose, malfunctioning or missing electromagnet.

16. The machine as in claim 14 wherein the poles of the electromagnets of the rotors and the stators are configured in groups which differ.

* * * * *